UNITED STATES PATENT OFFICE 2,036,649

IMPROVEMENT IN BIOLOGICAL PROCESS

Gregory Shwartzman, New York, N. Y.

No Drawing. Application March 19, 1932,
Serial No. 600,076

18 Claims. (Cl. 167—78)

This invention relates in general to the detection and analytical control of toxins and antitoxins.

It is an object of my invention to provide a new procedure whereby the presence of bacterial toxins may be demonstrated, and whereby toxins of unknown types may be identified.

A further object is to provide a procedure whereby antitoxins may be detected, and the antitoxic strength of sera measured or titrated.

Another object is to provide antitoxic sera for various reactive toxins, said sera having antitoxic powers of carefully measured or standardized strength.

It has been quite generally suspected that many of the common pathogenic bacteria may produce toxins. In only a few cases, however, has it been possible definitely to demonstrate the presence of such toxins; these cases being notably diphtheria, scarlet fever, tetanus, botulism, erysipelas and in the case of certain anaerobes such as B. welchii. Definite reactions have heretofore been worked out for these known cases, by means of which the toxins, or their corresponding antitoxins, may be detected or titrated. These however differ from the toxins which I have discovered and which I shall refer to hereinafter as "reactive toxins."

I have discovered an immunological phenomenon of wide application, whereby the reactive toxins and homologous antitoxins of a variety of pathogenic organisms can be demonstrated, detected and titrated. The application of this reaction in its various manifestations and uses, I shall describe and claim hereinafter. This reaction or phenomenon has become known among scientists as the Shwartzman phenomenon; and for the first time makes it possible not only to determine the existence of reactive toxins and their homologous antitoxins, but also to determine the biological potency of these reactive toxins and their homologous antitoxins, and of mixtures thereof, so that preparations of determined biological potency may be obtained.

In the following description, I shall refer in particular to B. typhosus, its reactive toxin and its homologous antitoxin; but it is to be understood that this is taken only as a typical example of the generalized phenomenon, and a wider application will be later indicated.

As a first step, a solution of B. typhosus reactive toxin may be prepared by planting the organism in a suitable medium, such as plain or tryptic digest broth, and incubating in the well known manner, for, say 6 days. The culture is then filtered through paper and cotton, and finally through a Berkefeld V candle, to give a sterile filtrate. Such a solution, which contains the reactive toxin of B. typhosus, will in the future for convenience be referred to as the "filtrate". As will be recognized by those skilled in the art, it may be desirable, in order to produce the highest potency reactive toxin, to select particular strains of the bacteria and variations of temperature, media and other factors, and such selections and variations are implied in this general example. Similar "filtrates" could of course, be made containing the toxins of other organisms, the culture medium being chosen with reference to the particular organism to be grown therein.

Animals are prepared for an initial injection of reactive toxin in any suitable and approved manner. The initial injection may be made into any organ and/or tissue of which the skin, liver, kidneys and mucous membrane of the nose, throat and intestines are examples. For instance an animal may be prepared for an intradermal injection by epilation of the abdominal surface with barium sulfide. I have generally used rabbits, and have found these quite satisfactory, although other animals can be used, such as those in which the blood vessels are richly distributed in the skin and/or other tissue and/or in an organ or organs, of which horses, dogs, cats, chickens and, of course, rabbits are examples. The demonstration will be described in connection with an intradermal injection or injections into a rabbit. However, it is to be strictly understood that the invention herein is in no way limited thereto but is of sufficient scope to cover any type of injection or animal herein mentioned or suggested, man included, or the equivalent thereof. For convenience in definition such animals will be referred to in the claims as animals having a surface in which the blood vessels are richly distributed.

A small quantity, say 0.25 c. c. of the reactive filtrate is injected intradermally into the rabbit. About 50 per cent of all rabbits injected show no reaction whatsoever to this treatment at this stage. In the remainder, an erythema, generally weak, and occasionally (12 per cent of the reacting animals) well pronounced, is produced. This reaction which is mild, is referred to as an erythema, to distinguish from a second and more violent reaction to be described, and also to distinguish it from the violent reaction under such procedure with primarily toxic materials.

If now, after an incubation period of about 24 hours, a small quantity, say 1 to 3 c. c. per kilo of body weight, of the filtrate is injected into the blood stream, most desirably intravenously, a profound reaction occurs. About 5 hours after the intravenous injection, there appears at the site of the intradermal injection a violent hemorrhagic necrosis. The general impression is that of the severest type of hemorrhage and necrosis, differing in this respect from the systemic reaction occurring from the intravenous injection of known toxins such as diphtheria toxin, etc., and also differing from the characteristic reactions occurring from the intradermal injection of such known toxins. The skin becomes edematous in places. Some of the blood vessels are ruptured, others contain small parietal thrombi. The subcutaneous tissue becomes engorged with blood There is an extensive migration of polymorphonuclear neutrophillic leucocytes; a pronounced necrobiosis of these cells appearing. It is rather unsettled, however, whether there is any primary injury to the arteries. Occasional hyalinzation is seen in the blood vessels. The hemorrhage and necrosis extend to the corium of the skin, which is thin, and may be broken in places. The size of these necrotic areas may be slightly variable, but can be said to approximate 2 x 2 cm., under the experimental conditions as described.

Similar phenomena are elicited for initial injections into any other tissue or into an organ.

The reactive toxin of the intravenous injection is found not to be specific to the reactive toxin of the initial injection. It is found that a filtrate containing any other reactive toxin may be used for the intravenous injection provided such reactive toxin will elicit the phenomenon when it is used for both injections.

With the reactive toxin of B. typhosus about 78 to 79 per cent. of the rabbits tested have been found susceptible to this reaction. The remainder has been found to be non-susceptible. With many other reactive toxins the percentage of susceptibility is higher. For instance, with meningococci it is about 99%. Similar percentages apply to the other animals mentioned. There is apparently no intermediate grade of suceptibility. An animal either reacts in the typical manner, or no effect whatsoever is produced by the intravenous injection. Occasionally an animal will die two or three hours after the intravenous injection, probably from the systemic effects of the reactive toxin. These animals are not taken into consideration, but are ignored, since their reaction is atypical. No definite correlation between susceptibility to the erythema above described, and to the hemorrhagic necrosis has been found.

It has been found that different areas of the abdominal skin react similarly. The same applies to the other tissues and to the surfaces of organs. It is therefore possible to induce the reaction at a number of places simultaneously; a point of considerable importance, since several tests may be made upon a single animal. When making intradermal injections into abdominal skin I have found it generally convenient to make four injections in each animal, in the upper right and left and lower right and left abdominal areas, respectively. Similar procedure may be adapted to initial injections into other tissues and into organs.

A certain period of time must elapse between the initial injection of the reactive factor in sensitizing the animal, and the second, intravenous, injection of the reactive factor to elicit the characteristic phenomenon. An incubation period of two hours is invariably insufficient; and the ability to react disappears in forty-eight hours after the preliminary injections. By making initial injections into the same animal at different times, it has been found that unless it is non-susceptible, an incubation period of twenty-four hours is invariably sufficient. This particular period may therefore be taken as a very convenient standard, though I do not limit myself thereto.

Different ways are known whereby the susceptibility of an animal to this phenomenon can be altered or enhanced. These, however, form no essential departure from the spirit of the present invention, and need not be considered here.

I am able, by my method, to produce and to demonstrate the existence of antitoxins specific to my reactive toxins. If an animal, such as a horse, a goat or rabbit is treated with reactive toxin, in the well known ways, to produce antibodies, the presence of an antitoxin in the serum may be shown.

If one or more spots on the skin or on any other tissue, or on an organ, of a rabbit or other animal are prepared with a reactive toxin-containing filtrate, to which has been added a certain optimum amount of an antitoxic serum prepared against the same type of organism (e. g. B. typhosus) it is found that the antitoxin in the serum will neutralize the reactive toxin in such a manner that subsequent intravenous injection of any toxin (unneutralized) will not call forth the characteristic reaction. A definite quantitative relationship exists between the reactive toxin and the homologous antitoxin.

If then a standard reactive toxin is chosen, it is possible to evaluate any number of antitoxic sera containing the antitoxin specific to such reactive toxin by comparing them with this standard reactive toxin. The unit of reactive toxin is defined as that quantity of toxin which when injected into the skin will so sensitize the skin or other tissue, or the surface of an organ, of a rabbit or other animal, as to just produce the described phenomenon after intravenous injection of an effective amount of filtrate containing the same toxin or another reactive factor.

Titration of an antitoxic serum then becomes simple. For instance a rabbit is injected in, say, the upper right area of the abdomen with a standardized reactive toxin. This serves as a control, since if the animal is non-susceptible, there will be no reaction at this point after the intravenous injection. Into the other three areas (upper left, lower right and left) are then injected reactive toxin mixed with varying measured quantities of the antitoxic serum to be tested. After the usual incubation period, an intravenous injection of a reactive toxin is given. The smallest quantity of serum which, mixed with one unit of reactive toxin, will just prevent the appearance of the hemorrhagic necrosis in an otherwise susceptible animal, may be adopted as a unit of antitoxin. By definition, therefore, a unit of antitoxin is the quantity of antitoxin that will just completely inhibit the reaction that is normally induced in a susceptible rabbit by a skin preparing dose of one unit of reactive toxin, followed substantially twenty-four hours later by an intravenous reacting dose of reactive toxin.

On the other hand it is possible in the mixtures of reactive toxin and antitoxin to hold the antitoxin constant and vary the amount of reactive toxin. Uses for such procedure will be apparent to persons skilled in the art. For instance, if the antitoxin is already standardized it is possible to titrate the reactive toxin using the antitoxin as a standard.

A serum so standardized can of course be subjected to the treatment customarily accorded to sera. It may be adjusted to the desired strength and sealed in ampoules for storage and distribution. The strength to which the antitoxin is to be adjusted will, of course, depend upon many factors. It may be desired to use a serum containing say, not less than 25 units per cubic centimeter. Again, as many as, say, 5000 units per cubic centimeter might be necessary under some conditions. The important feature is, not so much the numerical quantity as the fact that I am able to furnish sera whose antitoxic strengths are expressible and determinable in accurately reproducible units.

While I have given above examples directed generally to *B. typhosus*, it must be understood that my procedure is by no means limited to the reactive toxin and homologous antitoxin of this organism. Many other bacteria have been found to give reactive toxins, which, in turn give antitoxins, by means of which the reaction and its modifications as described may be reproduced. My method is a general one for the specific detection of reactive toxins and their antitoxins, and for the quantitative estimation of their strengths. Among other bacteria which have been tested and whose reactive toxins have been definitely proven to give, and whose homologous antitoxins will inhibit the reaction, may be mentioned: Pneumococcus, types I, II, and III; Meningococci of various serological groups; *B. coli*; *B. paratyphosus* A and B; *B. enteritidis*; *B. dysenteriæ*, types Y, Z, Mt. Desert, Shiga and Flexner; members of the hemorrhagic septicemia group; Streptococci from acute rheumatic fever; *Streptoccus viridans* from abscesses; *Streptococcus hemolyticus* from mastoiditis; *Cholera vibrio*; *B. pertussis*; *B. influenza*; gonococcus.

It is to be understood that the list enumerated above is merely illustrative, and my invention is by no means to be considered as limited thereto. My invention is to be construed as applied to all reactive toxin-producing bacteria, and to the standardized reactive toxins and antitoxins produced in accordance with my method, or variations thereof within the province of one skilled in the art.

Many variations of the method as outlined can be devised by any expert in the art. Thus, instead of preparing the skin or other tissue or an organ with titrated (partially or completely neutralized) reactive toxin solutions, I might use only unneutralized reactive toxin for this step, and inject mixtures of a constant amount of reactive toxin and varying measured quantities of the homologous antitoxin or mixtures of varying measured quantities of reactive toxin and a constant amount of antitoxin, later, intravenously. The intravenous injections will, of course, succeed each other or will be made on different animals so that the reaction of one will not interfere or modify the reaction of any other, and each will be preceded by a sensitizing initial injection. The method as first described, however, is preferred, as it permits several graded tests to be made upon one animal, as well as a control on the susceptibility of the animal.

Polyvalent sera might be prepared, containing titrated antitoxins of different bacteria, either of similar types such as the pneumococci or the typhoid group, or of entirely different groups.

Other applications of the reaction, which I have discovered and described, will be apparent. It is possible by means of it to study the effect of physical and chemical factors upon reactive toxins and antitoxins. Using the reaction as an indicator, I have found that the reactive toxin of *B. typhosus* is generally, though not invariably, inactivated by heating in an autoclave for an hour. The heat resistance varies with the strain employed. Heat resistance is not affected by varying the hydrogen ion concentration between the limits of pH 4.0–9.0.

The use of the reaction to test the properties of reactive toxins could be indefinitely extended. Reactive toxins might be concentrated by salting out, by alcohol precipitation, or by other procedures well known in the chemical and biological arts. In each case the concentration or destruction of the active factor could be accurately followed. Antitoxins would of course be susceptible to the same investigative procedures and control.

While throughout the description I have referred to a culture filtrate as the source of my reactive toxins it is obvious that I do not intend to limit myself thereto. A whole, unfiltered culture might be employed, if desired. On the other hand, many of the impurities might be removed from the filtrate, leaving a reactive toxin-containing fluid. Or the reactive toxin might be isolated, as by precipitation, and preserved dry or redissolved in an appropriate menstruum. All such preparations are to be considered as included, since they are mere variations within the skill of an expert in the art.

The same is true with respect to my antitoxic sera. The important feature is a fluid containing my antitoxin in a biologically active condition whether this fluid is derived primarily from the blood of an animal, or whether it is a solvent in which the isolated antitoxin is distributed. Or a dessicated preparation might be made which, when dissolved or suspended in a fluid in an appropriate and predetermined concentration would give a standard antitoxin. The important feature is again the presence of the substance in biologically uninjured condition; adventitious factors being negligible.

Furthermore live bacteria might be substituted for the reactive toxin of the initial injection. This procedure becomes very useful when the reactive toxin of the bacteria is difficult to obtain. A subsequent intravenous injection of a reactive toxin will bring forth the phenomenon the same as if the initial injection were with the reactive toxin of the bacteria employed. In other words the bacteria after injection produces its own reactive toxin.

My invention has many applications in the treatment of diseases. For instance in the case of an unknown disease having a specific reactive toxin, such toxin may be obtained from the blood, or in precipitates obtained from mixtures of sera with specific precipitating antisera or from tissue or organ extracts of the patient or from an animal to which the same disease has been communicated. The presence of a reactive toxin may be demonstrated by my process and an antitoxin may be found therefor with which to treat the patient. Other patients having like symptoms may be treated likewise. During all of this time the disease may be entirely unknown.

While the invention has been described in connection with an initial sensitizing dose of a reactive toxin, mixtures of reactive toxins and antitoxins, and live bacteria, it is to be strictly understood that it is not limited thereto.

A virus might be substituted for the reactive toxin, mixture of toxin and antitoxin, or live bacteria of the initial injection. To demonstrate the presence of the virus the same procedure is followed. That is, after a suitable period of incubation an intravenous injection of a reactive toxin or other reactive factor is made which brings forth the characteristic reaction at the site of the injection of virus.

Likewise mixtures of a virus and its corresponding neutralizing factor or inactivating serum may be made and employed in the same manner as mixtures of reactive toxin and antitoxin as above described for identification and for titration purposes. However, such mixtures unlike mixtures of reactive toxin and antitoxin are preferably used only for initial sensitizing injections. Such mixtures of virus and neutralizing or inactivating serum are preferably not used for the subsequent intravenous injection. It is desirable to use an intravenous injection of reactive toxin to bring forth the characteristic reaction with a marked degree of certainty.

Smallpox virus, cowpox virus, and infantile paralysis virus are examples. However, the invention is in no way limited thereto.

While I have described the skin or other tissue or the surface of an organ as suitable for the injection of the initial sensitizing dose, it is to be understood that the invention is in no way limited thereto. For instance, it is found that the surface of a malignant or benign tumor may be so prepared. In fact, it is found that the characteristic reaction is elicited in tumors selectively by an intravenous injection of toxin, without the initial preparatory step.

Since the reaction brings about complete necrosis of the tumor, this observation suggests its application to the treatment of tumors with reactive toxins.

For the purpose of this specification and the claims, the following terms shall have the meaning set forth:

The term "reactive factor" as used herein is to be construed as meaning any substance which, when injected into the skin or other tissue or organ of an animal of the class hereinbefore defined, will elicit the state of reactivity manifested by severe hemorrhagic and necrotic lesions at the site of such injection upon injection of the same substance or another reactive factor intravenously into the same animal. Reactive toxins and live bacteria and viruses that are productive of reactive toxins or similarly behaving toxic substances are given as examples of reactive factors.

The term "reactive toxin" as used herein is intended to mean a toxin that will elicit the phenomenon described above when used for both the initial sensitizing dose and for the subsequent intravenous injection.

The term "neutralizing factor" refers to a neutralizing substance for a reactive factor. Examples of such neutralizing substances are the antitoxins and the similarly behaving antibodies produced in the body of an animal as a result of the stimulating influence of a bacterial reactive toxin or of a toxic substance given off by a reactive virus present in said animal.

The term "inactivating serum" as used herein is to be construed as meaning a serum containing a neutralizing factor.

By "a sensitizing of the animal" I mean inducing in the animal, at least at or near the site of the preparatory injection, a state of reactivity to an intravenous injection of a reactive factor made within a proper period of time thereafter.

This application is a continuation in part of my copending application Serial No. 335,389 filed January 26, 1929 for Biological process and product.

Having described my invention it is obvious that many modifications may be made in the same within the scope of the claims without departing from the spirit thereof.

I claim:

1. In a process of detecting the presence of a reactive factor in a fluid suspected of containing said factor, the steps which comprise inoculating an animal having a surface in which the blood vessels are richly distributed by injecting a portion of said fluid into said surface, and subsequently, after an incubating period sufficient to insure a sensitizing of the animal by said reactive factor if present, injecting a fluid containing a reactive factor intravenously into said animal.

2. In a process of the kind described, the steps of demonstrating the presence of a reactive toxin in a fluid suspected of containing said toxin, comprising inoculating an animal having a surface in which the blood vessels are richly distributed by injecting a portion of said fluid into said surface, and subsequently, after an incubating period sufficient to insure a sensitizing of the animal by said toxin if present, injecting a fluid containing a reactive toxin intravenously into the animal.

3. In a process of the kind described, the steps of demonstrating the presence of a reactive toxin, comprising inoculating a rabbit in a surface in which the blood vessels are richly distributed with a reactive toxin-containing fluid, and subsequently, after an incubating period sufficient to insure a sensitizing of the animal by said toxin, injecting a fluid containing a reactive toxin intravenously into said rabbit.

4. A process of titrating and standardizing toxins and antitoxins comprising mixing measured portions of fluid containing a reactive toxin with measured portions of fluid containing a corresponding antitoxin, to produce a plurality of mixtures in which one of the components is constant and the other is present in varying amounts, and injecting each mixture individually and isolatedly into an animal surface in which the blood vessels are richly distributed, permitting incubation sufficient to insure a sensitizing of the animal by said toxin and then injecting a fluid containing a reactive factor intravenously into the animal or animals employed.

5. A process for titrating and standardizing antitoxins, including the steps of mixing measured portions of known strength of fluid containing a reactive toxin with graded measured portions of fluid containing the corresponding antitoxin, injecting each mixture into an animal surface in which the blood vessels are richly distributed, and subsequently, after an incubating period sufficient to insure a sensitizing of the animal by said reactive toxin, injecting a fluid containing a reactive toxin intravenously into the animal or animals employed.

6. A process for titrating and standardizing toxins, comprising mixing measured portions of known strength of fluid containing an antitoxin corresponding to a given reactive toxin with varying measured portions of fluid containing said corresponding reactive toxin, injecting each mixture individually and isolatedly into an animal surface in which the blood vessels are richly distributed, and subsequently, after an incubating period sufficient to insure a sensitizing of the animal by said reactive toxin, injecting a fluid containing a reactive toxin intravenously into the animal or animals employed.

7. A process for titrating and standardizing viruses and inactivating sera comprising mixing portions of a reactive virus with portions of a corresponding inactivating serum to form a plurality of mixtures, one of the constituents in said mixtures remaining constant and the other being present in varying amounts, injecting each mixture individually and isolatedly into an animal surface in which the blood vessels are richly distributed, and subsequently, after an incubating period sufficient to insure a sensitizing of the animal by said reactive virus, injecting a fluid containing a reactive factor intravenously into the animal or animals employed.

8. A process for titrating and standardizing viruses and inactivating sera comprising mixing portions of a reactive virus with portions of a corresponding inactivating serum to form a plurality of mixtures, one of the constituents in said mixtures remaining constant and the other being present in varying amounts, injecting each mixture individually and isolatedly into an animal surface in which the blood vessels are richly distributed, and subsequently, after an incubating period sufficient to insure a sensitizing of the animal by said reactive virus, injecting a fluid containing a reactive toxin intravenously into the animal or animals employed.

9. A process for titrating and standardizing inactivating sera including the steps of mixing measured portions of known strength of a fluid containing a reactive factor with graded measured portions of a fluid containing the corresponding neutralizing factor, injecting each mixture individually and isolatedly into an animal surface in which the blood vessels are richly distributed, and subsequently, after an incubating period sufficient to insure a sensitizing of the animal by said reactive factor, injecting a fluid containing a reactive factor intravenously into the animal or animals employed.

10. A process for titrating and standardizing inactivating sera including the steps of mixing measured portions of known strength of a fluid containing a reactive virus with graded measured portions of a fluid containing the corresponding inactivating serum, injecting each mixture individually and isolatedly into an animal surface in which the blood vessels are richly distributed, and subsequently, after an incubating period sufficient to insure a sensitizing of the animal by said reactive virus, injecting a fluid containing a reactive factor intravenously into the animal or animals employed.

11. A process for titrating and standardizing inactivating sera including the steps of mixing measured portions of known strength of a fluid containing a reactive virus with graded measured portions of a fluid containing the corresponding inactivating serum, injecting each mixture individually and isolatedly into an animal surface in which the blood vessels are richly distributed, and subsequently after an incubating period sufficient to insure a sensitizing of the animal by said reactive virus, injecting a fluid containing a reactive toxin intravenously into the animal or animals employed.

12. A process for titrating and standardizing viruses comprising mixing portions of known strength of a fluid containing an inactivating serum corresponding to an active virus with varying measured portions of fluid containing said corresponding virus, injecting each mixture individually and isolatedly into an animal surface in which the blood vessels are richly distributed, and subsequently, after an incubating period sufficient to insure a sensitizing of the animal by said reactive virus, injecting a fluid containing a reactive factor intravenously into the animal or animals employed.

13. A process for titrating and standardizing viruses comprising mixing portions of known strength of a fluid containing an inactivating serum corresponding to an active virus with varying measured portions of fluid containing said corresponding virus, injecting each mixture individually and isolatedly into an animal surface in which the blood vessels are richly distributed, and subsequently, after an incubating period sufficient to insure a sensitizing of the animal by said reactive virus, injecting a fluid containing a reactive toxin intravenously into the animal or animals employed.

14. A process of the kind described which comprises mixing portions of a reactive factor with portions of a corresponding neutralizing factor, one of the constituents of said mixtures being maintained constant and the other being present in varying amounts, injecting each mixture individually and isolatedly into an animal surface in which the blood vessels are richly distributed, and subsequently, after an incubating period sufficient to insure a sensitizing of the animal by said reactive factor, injecting a fluid containing a reactive factor intravenously into the animal or animals employed.

15. A process for titrating and standardizing antitoxins comprising sensitizing a plurality of animals having surfaces in which blood vessels are richly distributed by injecting a reactive factor into such a surface of each animal and permitting incubation to proceed for a suitable period, mixing measured portions of a fluid containing a reactive toxin of known strength with graded measured portions of a fluid containing the corresponding antitoxin and injecting one of said mixtures intravenously into each animal treated as aforesaid.

16. A process for standardizing toxins comprising sensitizing a plurality of animals having surfaces in which blood vessels are richly distributed by injecting a reactive factor into such a surface of each animal and permitting incubation to proceed for a suitable period, mixing measured portions of known strength of a fluid containing an antitoxin with graded measured portions of a fluid containing the corresponding toxin, and injecting one of said mixtures intravenously into each animal treated as aforesaid.

17. A process for standardizing inactivating sera comprising sensitizing a surface of an animal in which blood vessels are richly distributed by injecting therein a reactive factor and permitting incubation to proceed for a suitable period, mixing measured portions of known strength of a reactive toxin with graded measured portions of a serum containing the corresponding antitoxin, injecting one of the resulting mixtures intravenously into the animal employed, re-sensitizing said animal as aforesaid and continuing said injections and re-sensitizing steps in alternation and in a definite order with respect to said mixtures until an indicative reaction is observed.

18. A process for standardizing toxins comprising sensitizing a surface of an animal in which blood vessels are richly distributed by injecting therein a reactive factor and permitting incubation to proceed for a suitable period, mixing measured portions of known strength of an antitoxin corresponding to a given reactive toxin with graded measured portions of a fluid containing said toxin, injecting one of the resulting mixtures intravenously into the animal employed, re-sensitizing said animal as aforesaid, and continuing said injections and re-sensitizing steps in alternation and in a definite order with respect to said mixtures until an indicative reaction is observed.

GREGORY SHWARTZMAN.